United States Patent
Yoganathan et al.

(10) Patent No.: US 10,057,022 B2
(45) Date of Patent: Aug. 21, 2018

(54) METHOD FOR CONTROLLING ACCESS TO AN IN-VEHICLE WIRELESS NETWORK

(71) Applicant: YAZAKI CORPORATION, Toyko (JP)

(72) Inventors: Sivashankar Yoganathan, Moorpark, CA (US); Anand Ganesan Kaygee, Oak Park, CA (US); Michael David Dipperstein, Camarillo, CA (US); Roy Lujan Soto, Moorpark, CA (US)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/277,613

(22) Filed: Sep. 27, 2016

(65) Prior Publication Data

US 2017/0093536 A1    Mar. 30, 2017

Related U.S. Application Data

(60) Provisional application No. 62/233,937, filed on Sep. 28, 2015.

(51) Int. Cl.
*H04W 4/00* (2009.01)
*H04L 5/00* (2006.01)
(Continued)

(52) U.S. Cl.
CPC ........ *H04L 5/0032* (2013.01); *H04L 63/0492* (2013.01); *H04L 63/0807* (2013.01);
(Continued)

(58) Field of Classification Search
CPC ...... H04L 67/12; H04W 84/005; H04W 4/046
See application file for complete search history.

(56) References Cited

U.S. PATENT DOCUMENTS 7,065,349 B2   6/2006  Nath et al.
8,432,261 B2   4/2013  Talty et al.
(Continued)

FOREIGN PATENT DOCUMENTS

DE   102012020900 A1   4/2013
EP       2770787 A1   8/2014
(Continued)

OTHER PUBLICATIONS

International Search Report and Written Opinion for International Application No. PCT/US2016/058306, dated Feb. 2, 2017.
(Continued)

*Primary Examiner* — Shukri Taha
(74) *Attorney, Agent, or Firm* — Perkins Coie LLP; Michael J. DiCato; Jordan M. Becker

(57) ABSTRACT

Disclosed is a technique for managing access by a portable device to an in-vehicle router system (IVRS). The IVRS determines network access privilege of the portable device located within the vehicle. The portable device determines whether it is connected to a wireless access point (AP) of the IVRS or a rogue network. The portable device transmits a first token to the wireless AP, via a first communication link implementing a first protocol stack, to prompt the wireless AP to reply with a second token. The portable device receives the second token via a second communication link implementing a second protocol stack different than the first protocol stack between the portable device and the IVRS. The portable device determines whether the second token matches the first token. If the second token is determined to match the first token, the portable device authenticates the wireless AP.

34 Claims, 15 Drawing Sheets

(51) Int. Cl.

| | | |
|---|---|---|
| *H04W 12/08* | (2009.01) | |
| *H04L 29/08* | (2006.01) | |
| *H04L 29/06* | (2006.01) | |
| *H04W 12/06* | (2009.01) | |
| *H04W 12/12* | (2009.01) | |
| *H04W 88/02* | (2009.01) | |
| *H04W 88/08* | (2009.01) | |

(52) U.S. Cl.
CPC ............. *H04L 63/18* (2013.01); *H04L 67/04* (2013.01); *H04L 67/12* (2013.01); *H04W 12/06* (2013.01); *H04W 12/08* (2013.01); *H04W 12/12* (2013.01); *H04L 67/125* (2013.01); *H04L 2209/84* (2013.01); *H04W 88/02* (2013.01); *H04W 88/08* (2013.01)

(56) References Cited

U.S. PATENT DOCUMENTS

| | | | |
|---|---|---|---|
| 8,514,825 B1 * | 8/2013 | Addepalli | H04W 4/046 |
| | | | 370/338 |
| 8,812,065 B2 | 8/2014 | Miller et al. | |
| 9,008,641 B2 | 4/2015 | Yang et al. | |
| 9,032,493 B2 | 5/2015 | Lortz et al. | |
| 9,253,589 B2 * | 2/2016 | McCann | H04W 4/008 |
| 9,521,238 B1 | 12/2016 | Thanayankizil et al. | |
| 9,813,897 B2 * | 11/2017 | Manente | H04W 8/22 |
| 2005/0184860 A1 | 8/2005 | Taruki et al. | |
| 2006/0031447 A1 | 2/2006 | Holt et al. | |
| 2011/0039581 A1 | 2/2011 | Cai et al. | |
| 2013/0217331 A1 | 8/2013 | Manente | |
| 2013/0237148 A1 | 9/2013 | McCann et al. | |
| 2013/0260725 A1 | 10/2013 | Sharma | |
| 2014/0040975 A1 | 2/2014 | Raleigh et al. | |
| 2015/0063329 A1 | 3/2015 | Pebbles et al. | |
| 2015/0121527 A1 | 4/2015 | Cho et al. | |
| 2015/0126171 A1 | 5/2015 | Miller et al. | |
| 2015/0138001 A1 | 5/2015 | Davies et al. | |
| 2015/0148018 A1 | 5/2015 | Peterson et al. | |
| 2016/0234870 A1 * | 8/2016 | Borges | H04L 67/12 |
| 2017/0090987 A1 | 3/2017 | Hearn et al. | |

FOREIGN PATENT DOCUMENTS

| | | |
|---|---|---|
| WO | 2013/165989 A2 | 11/2013 |
| WO | 2013189510 A1 | 12/2013 |

OTHER PUBLICATIONS

International Search Report and Written Opinion for International Application No. PCT/US2016/054198, dated Jan. 19, 2017.
Final Office Action dated Dec. 7, 2017 in U.S. Appl. No. 15/331,750.

* cited by examiner

METHOD FOR CONTROLLING ACCESS TO AN IN-VEHICLE WIRELESS NETWORK

CROSS-REFERENCE TO RELATED APPLICATION(S)

This application claims the benefit of U.S. Provisional Patent Application No. 62/233,937, titled "Method for Controlling Access to an In-Vehicle Wireless Network" and filed on Sep. 28, 2015, which is incorporated by reference herein in its entirety.

TECHNICAL FIELD

At least one embodiment of the technique introduced herein relates to wireless communication, and more particularly, to controlling access to an in-vehicle wireless network.

BACKGROUND

A conventional method for a user of a Wi-Fi enabled portable device to authenticate the device with a network Access Point (AP) involves the user selecting a wireless network name (SSID—Service Set Identifier) of the wireless network that the user wants to connect and manually entering a pre-shared key (PSK). Once authenticated, the portable device retains the Wi-Fi network credentials so that it can automatically connect to the AP whenever the portable device and the AP are within communication range.

However, this conventional approach has several disadvantages. For instance, network credentials can be shared with others without permission, AP network configurations are often not frequently changed to safeguard against unauthorized network access, changing network credential may be challenging for a typical user, and multiple APs can broadcast the same network details causing devices to connect to incorrect or rogue Wi-Fi networks.

DETAILED DESCRIPTION

Figure 1A:
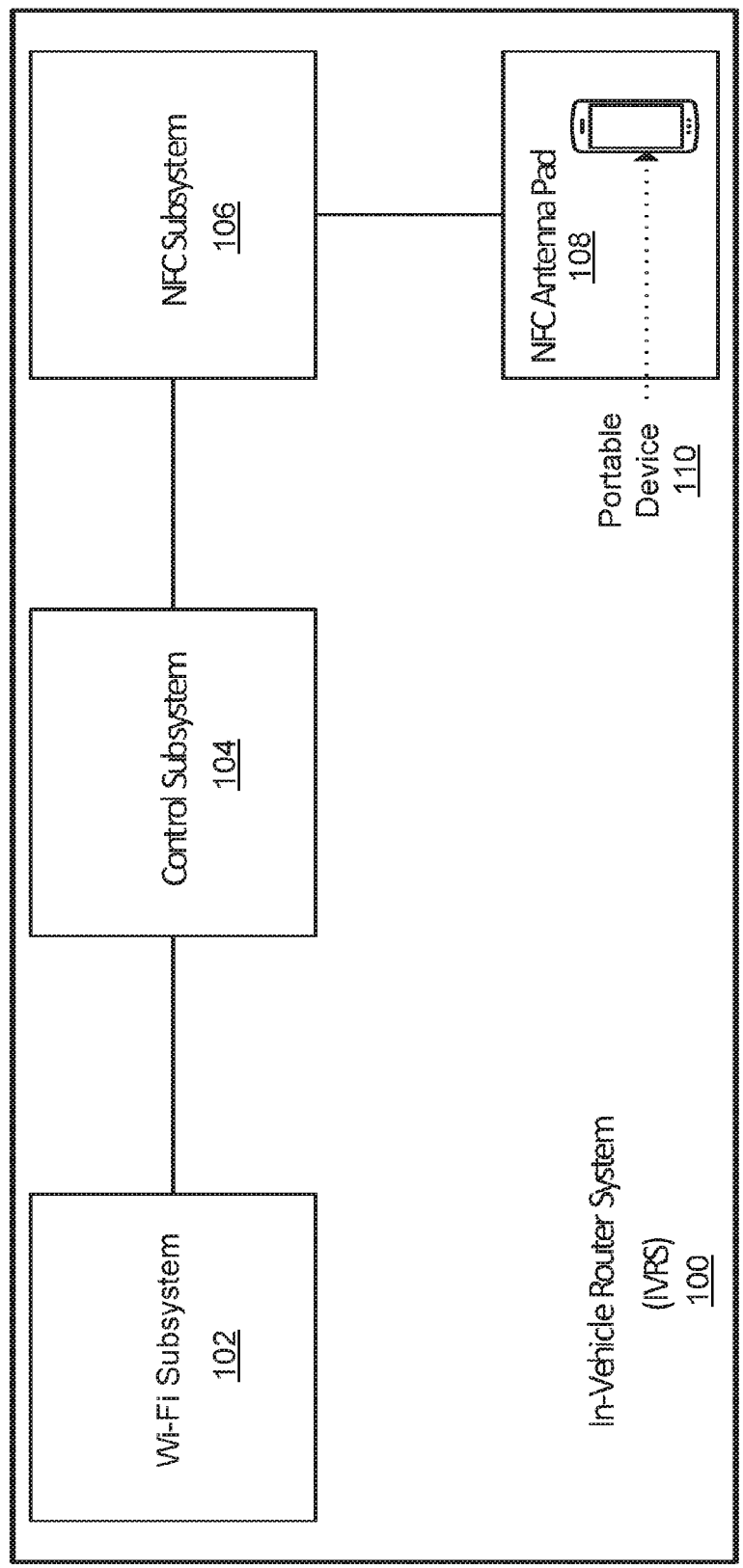
FIG. 1A is a block diagram illustrating an out of band communication between the IVRS and an NFC enabled portable device.

The technique introduced here can resolve problems posed by conventional methods by implementing a two-stage authentication mechanism to manage network access. The first stage involves transmitting a randomly generated token to a portable device via a first communication link, and receiving the randomly generated token from the portable device via a second communication link while maintaining both links in an active and connected state. The first stage can confirm that the portable device is within a communication range of both the first communication link (e.g., a wireless local area network (WLAN)) and the second communication link (e.g., near field communication). A first communication device provides the first local wireless link to the in-vehicle router system (IVRS) and a second communication device provides the second wireless link to the IVRS. The first communication device may have a range extending beyond the limits of a vehicle and the second communication device may have a communication range limited to within the vehicle. The communication range of the second communication device can range from approximately 0 centimeters (cm) to approximately 20 cm, and ranges therebetween. For example, if one of the communication devices is a near-field communication (NFC) device located within a vehicle and has a communication range of 10 cm, the NFC device can confirm the portable device is located within the vehicle. For example, an in-vehicle router system (IVRS) establishes communication with a portable device where the communication with the IVRS is limited to a secure subsystem. A wireless router of the IVRS transmits a first token to the portable device. An NFC device of the IVRS receives a second token from the portable device. The IVRS determines whether the first token matches the second token. In response to determining the first token matches the second token, the IVRS obtains authorization to enable network access privilege to the portable device. In response to determining that the first token and the second token do not match, the IVRS denies network access privilege to the portable device.

The second stage involves the mobile device transmitting a randomly generated token through a short range communication link (e.g., a wireless or wired link) of the IVRS, and the IVRS transmitting the randomly generated token back to the portable device through a WLAN interface of the IVRS. The second stage can be used by a portable device to confirm that a wireless network connection is provided by the IVRS and not a rogue network. A rogue network is a network having similar credentials as the IVRS and thus appearing to the portable device as being provided by the IVRS. A short range communication device (e.g., an NFC device) of the IVRS receives a third token from the portable device. In response to receiving the third token, a WLAN device of the IVRS transmits a fourth token corresponding to the third token to the portable device. The portable device determines whether the third token matches the fourth token to verify that a network connection is provided by the IVRS.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments described are not necessarily mutually exclusive.

Introduced herein is a technology for controlling access to a wireless network, such as an in-vehicle wireless network. The technique introduced herein may provide greater security for a wireless network than is available in conventional methods. Methods for managing access to a wireless network disclosed herein may also provide a network administrator with greater control over which devices are allowed access to the wireless network than is available with conventional methods.

Conventional methods for accessing a wireless network may involve selecting a wireless network name (SSID—Service Set Identifier) of the wireless network and manually entering a pre-shared key (PSK) (password). Once authenticated, a device may retain the wireless network credentials and automatically reconnect to the wireless network when the device is within communication range to an access point (AP) of the wireless network. However, this conventional approach has several disadvantages, including posing a security risk to users of the wireless network.

Conventional methods of sharing network access credentials (e.g., SSID and PSK) make the wireless network vulnerable since the credentials can easily be obtained by an unauthorized user. For example, an authorized user sharing the PSK with another user without permission by a network operator. Some smart phones even allow sharing network access details simply by tapping phones. In another example, network access credentials may be stolen by an unauthorized user. A user can infect an access point with a virus to obtain cached network access credentials.

Frequently changing network access credentials can improve network security. However, a typical user may not frequently change access point credentials to safeguard against unauthorized network access.

Reconfiguring conventional network access information may be challenging for a typical user. A user may be required to know details about the configuration of the access point to change access point credentials. Thus, even if a user is aware of unauthorized network access, the user may be helpless to prevent the unauthorized access.

Conventional network systems may not provide dynamic interactive device access management. The network system may not provide a way for a device to gain access into the network (other than providing a network credentials), and the network system may not provide a way for a user to manage access to the network for a particular device.

Multiple Access points can broadcast the same network details, causing devices to connect to rogue wireless networks. Rogue devices can also pretend to be an authorized device requesting access to the vehicle wireless network.

Embodiments of the present invention can resolve these problems posed by conventional methods. Methods for controlling access to a network described herein may provide improved network security and enable a user to easily manage device access to the network. The present invention may be implemented as an in-vehicle wireless network system, as part of another device, or as a standalone system. Wireless access credentials may be randomized to increase security of the wireless network. The wireless network includes a two-stage authentication mechanism to limit access of portable devices. A user (e.g., a network administrator) can manage devices allowed to access the wireless network.

More specifically, embodiments of the present invention disclosed herein include one or more of the following features:

Preprogrammed and Configurable Network Credential Update: The solution introduced here resolves the problem of infrequent credential updates by independently generating and maintaining the creation and management of wireless network credentials (e.g., SSID and PSK for a Wi-Fi network). The system periodically generates a random SSID and PSK. The system may be configured by a network administrator (e.g., a vehicle owner) to change one or more variables including, for example, a frequency (e.g., every vehicle startup, daily, weekly, hourly, etc.) for randomly generating network credentials.

Dynamic Interactive Device Access Management: The solution enables dynamic interactive management of new devices requesting access to the vehicle Wi-Fi network. The solution maintains a list of devices that are approved by a network administrator (e.g., the vehicle owner) to connect to the vehicle Wi-Fi network. When a new device requests access to the vehicle's Wi-Fi network, the solution introduced here will automatically communicate with a network administrator (e.g., the vehicle owner) using methods such as text, email, or interactive voice response system to inform an administrator that a new device is requesting access to the network and services provided by the network. The solution will provide an administrator of the vehicle network with information it has gathered from the new device about the device and its owner so that the administrator can decide on whether to grant access to the vehicle network(s) and services. The solution enables easy management of device access to the vehicle network(s) even while the vehicle owner is not present in the vehicle.

Managing Sharing of Network Access Credentials: It is difficult for the administrator (e.g., the vehicle owner) to prevent users from sharing the network details with others. The solution limits granting access to devices that are physically inside the vehicle at the time of requesting network access. This prevents devices that are outside the vehicle from establishing connection to the vehicle Wi-Fi network. The solution uses out of band communication of network configuration and a two-stage network access authentication with the device to connect to the vehicle Wi-Fi network. The solution improves security for both the vehicle Wi-Fi network system and the connecting device by providing a method for each party to verify the identity of the other before accessing the vehicle wireless network.

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The conventional method for a user of a Wi-Fi enabled portable device to authenticate the device with a network Access Point (AP) is for the user to select the SSID of the wireless network he/she wants to connect and manually enter the shared key (password). Once authenticated, the portable device retains the Wi-Fi network credentials so that it can automatically connect to the Wi-Fi AP whenever the portable device is within communication range.

Near Field Communication (NFC) enables very short range wireless communication between NFC enabled portable devices and an In-Vehicle Router System (IVRS). NFC is a short range wireless communication with a typical range of 10 cm. The IVRS uses NFC for secure out of band communication to exchange wireless network details with NFC enabled portable devices that are physically brought in to the vehicle. Using NFC for out of band communication enables the IVRS to securely share Wi-Fi network credentials with portable devices, allowing them to automatically connect to IVRS Wi-Fi networks without user having to select or enter network details manually. Short range wired communication (e.g., USB) may be used for the same purpose.

Figure 1B:
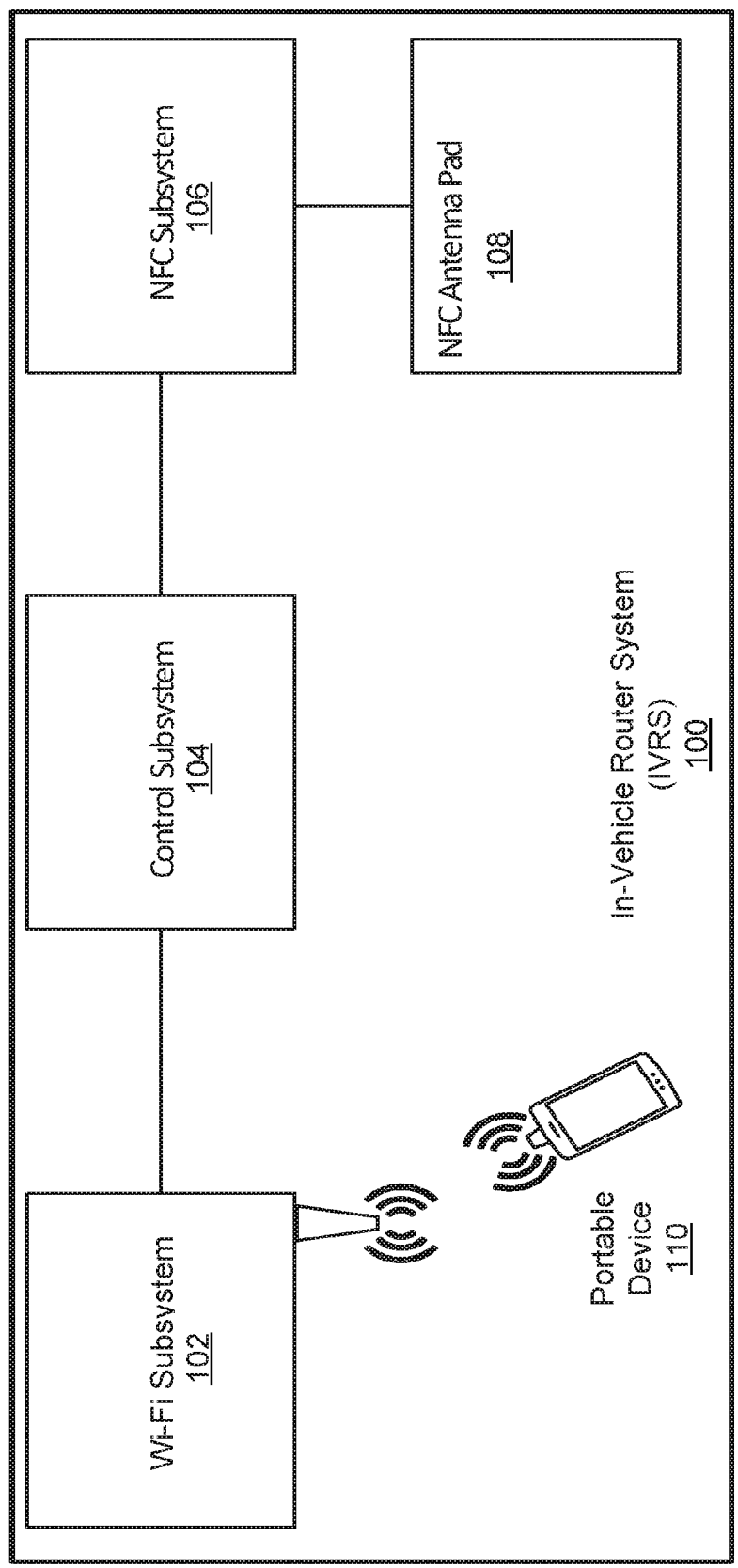
FIG. 1B is a block diagram illustrating a router system authenticating a portable device.

FIGS. 1A-1B are block diagrams illustrating an in-vehicle router system (IVRS) 100 authenticating a portable device 110. The IVRS 100 may include, for example, a wireless network subsystem (e.g., a Wi-Fi subsystem) 102, control system 104, a short range network subsystem (e.g., near-field communication subsystem) 106, and a short range out of band communication device (e.g., an NFC antenna pad) 108.

FIG. 1A shows an out of band communication (e.g., via a wireless link) between the short range communication device 108 of the IVRS 100 and a portable device 110. The IVRS 100 and the portable device establish a wireless link (e.g., a secure NFC session). The IVRS 100 provides the portable device 110 with the wireless network details (e.g., SSID and PSK) via the wireless link.

FIG. 1B shows the portable device connecting to the wireless network subsystem 102 of the IVRS. The portable device 110 can connect to the wireless network subsystem using the network credentials received through the NFC session with the IVRS 100. The short range communication (e.g., via a wireless link) described herein can include NFC, but it is not limited to NFC. The out of band communication can utilize any short range wireless communication or wired communication.

Figure 2:
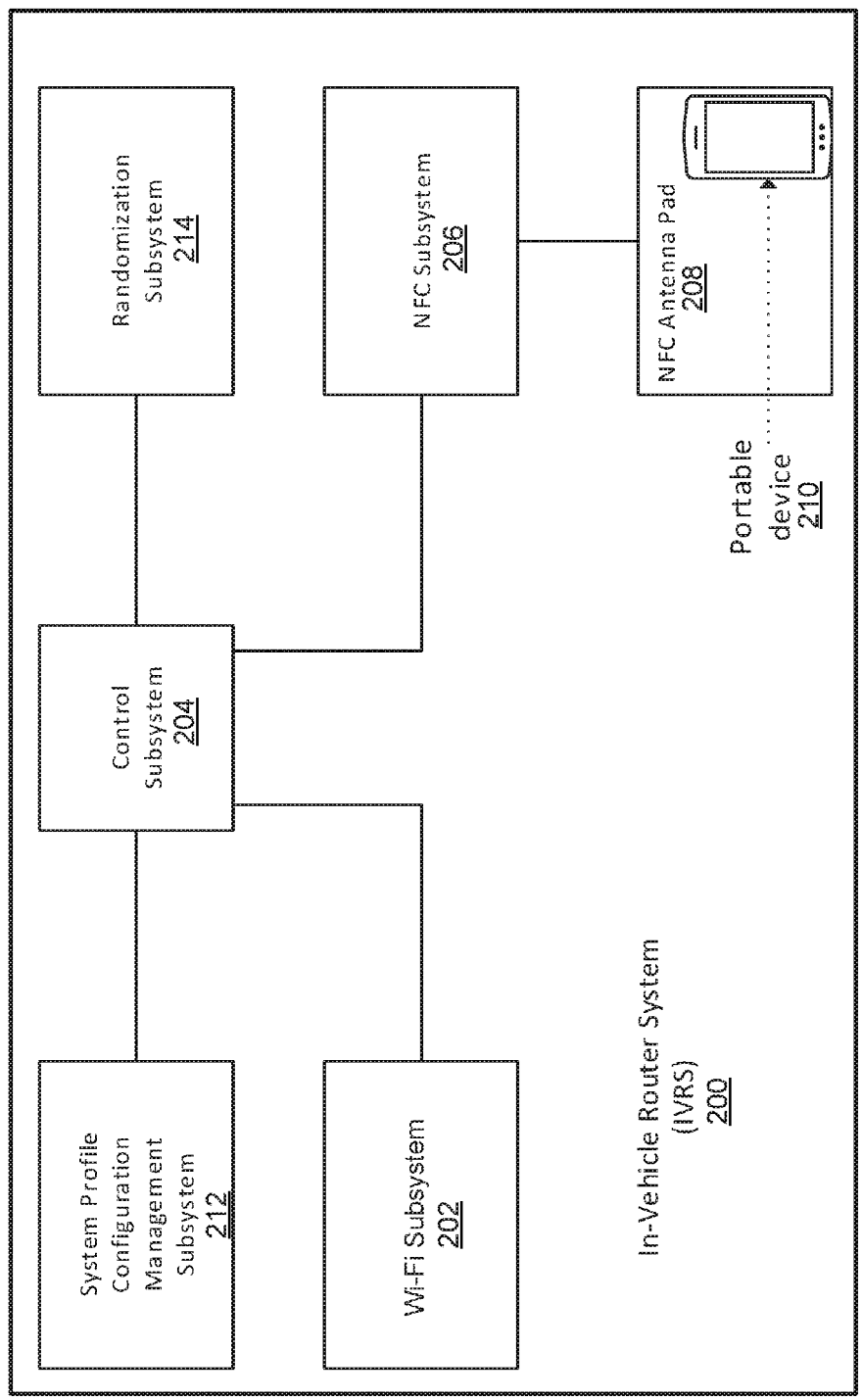
FIG. 2 is a block diagram illustrating components of a router system.

FIG. 2 is a block diagram illustrating components of an in-vehicle router system (IVRS) 200. Various components of the IVRS 200 can be used alone or in combination with other components to secure network access. The IVRS 200 can include a Wi-Fi subsystem 202, control system 204, NFC subsystem 206, NFC antenna 208, profile management subsystem 212, randomization subsystem 214, or any combination thereof.

Access to a wireless network is managed by the public name of the wireless network (SSID) and the associated pre-shared key (network password). The method and system described here eliminates the need for the administrator (owner of the vehicle) to be responsible for:

Manually creating unique and strong wireless network access credentials;

Changing the wireless network credentials on a regular basis to maintain security;

Remembering and sharing the network credentials with authorized portable devices.

The IVRS 200 has a randomization subsystem 214 that includes both software and hardware that is responsible for generating unique random SSIDs and shared keys. The randomization subsystem can be configured to generate varying lengths of data that are suitable for many of the IVRS Wi-Fi network(s), such as the SSID, shared key, and MAC address. It is capable of generating crypto-graphical keys based on both true random and pseudo random generators.

The IVRS 200 also has a System Profile Configuration Management subsystem 212 that maintains many configuration profiles including one for wireless network management. The wireless network management configuration profile contains all of the parameters that enable an administrator of the IVRS 200 to manage wireless network access. Some of the configuration options include: a list of details of allowed and blocked devices, a means to specify the frequency of a Wi-Fi network credential change, a list of network credentials to change, a list of available Wi-Fi networks, and a list of services available on each Wi-Fi network.

Figure 3:
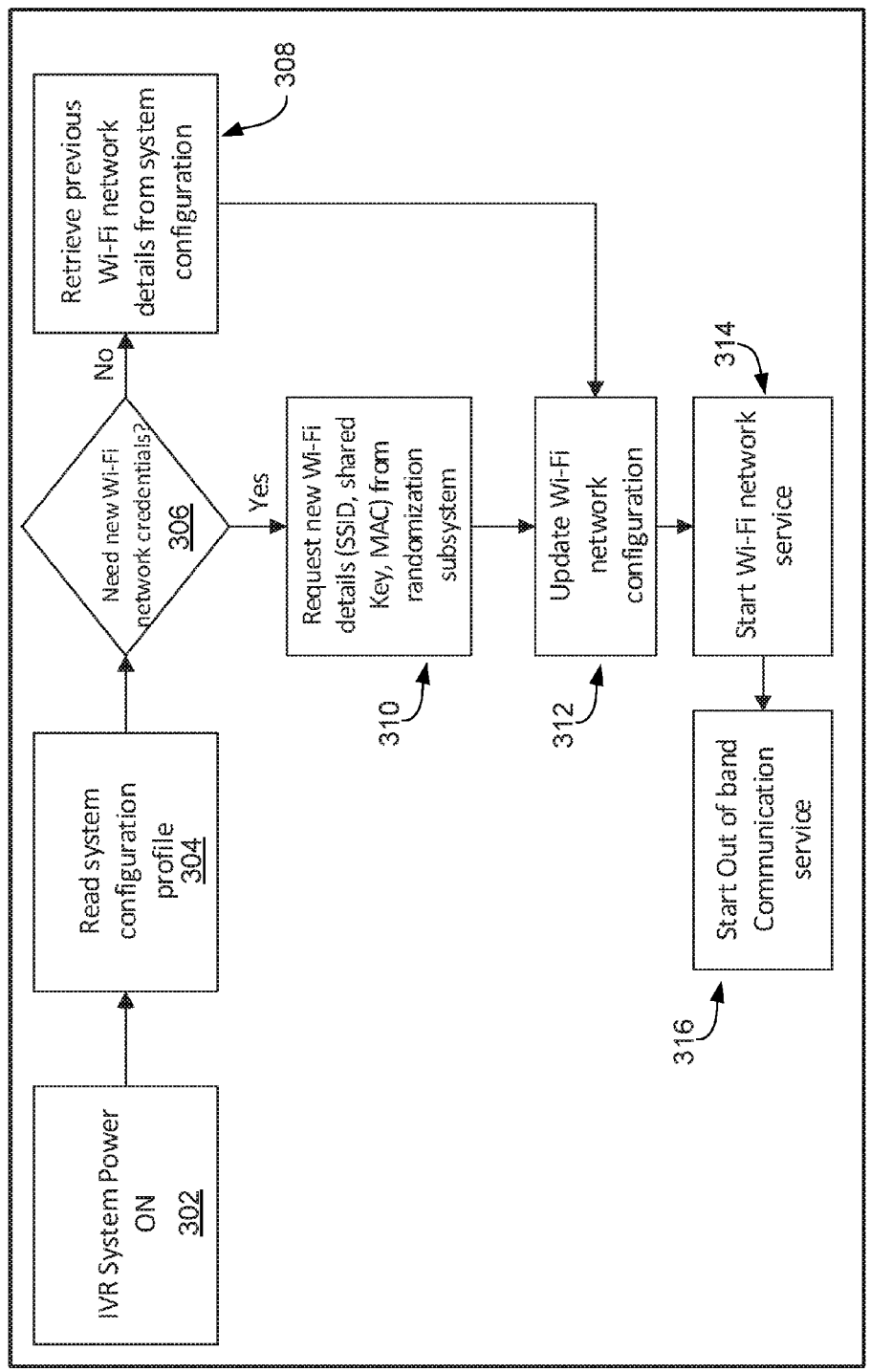
FIG. 3 is a flow diagram of a process for managing access to a wireless network.

FIG. 3 is a flow diagram of a process for managing access to a wireless network. More specifically, FIG. 3 shows an example process of how a randomization subsystem (e.g., randomization subsystem 214) and a profile management subsystem (e.g., profile management subsystem 212) are used by IVRS (e.g., IVRS 200) to configure the in-vehicle wireless networks. The randomization subsystem generates a random or pseudo random token (e.g., SSID, shared key, etc.) upon the occurrence of a triggering event. A triggering event includes, for example, power on of the IVRS, expiration of a period of time, a number of incorrect login attempts, a request from an administrator, or any combination thereof. Some triggering events can be configurable. For example, an administrator can select a time period that will trigger generation of a new token after expiration of the time period. In another example, an administrator can select a number of incorrect login attempts that will trigger generation of a new token after the IVRS detects the number of incorrect login attempts. Generating a new token after a number of incorrect login attempts can provide additional security by making the token a moving target, and thus, greatly diminishing the probability that an unauthorized user could determine the token by trial and error.

In an embodiment, the default wireless network configuration profile requires the IVRS to generate a new token (e.g., Wi-Fi network credentials) at every vehicle power on. Therefore portable devices that were previously authenticated with the old network credentials will not be able to automatically connect to the vehicle's Wi-Fi networks at the next vehicle power on. The portable devices need to obtain the new Wi-Fi network details through out of band Near Field Communication at each vehicle power on.

As shown in FIG. 3, a process for generating a new token may include the IVRS powering on (step 302), reading the system configuration profile 304, determining whether a new token (e.g., new Wi-Fi network credentials) is needed (decision 306), if a new token is not needed, retrieving a previous token (e.g., previous Wi-Fi network credentials) from system configuration (step 308), if a new token is needed, requesting a new token (e.g., Wi-Fi network credentials) from a randomization subsystem (e.g., the randomization subsystem 214) (step 310), updating the network configuration (e.g., Wi-Fi network configuration) (step 312), starting network service (e.g., Wi-Fi service) (step 314), and starting out of band communication service (e.g., NFC service) (step 316).

Figure 4:
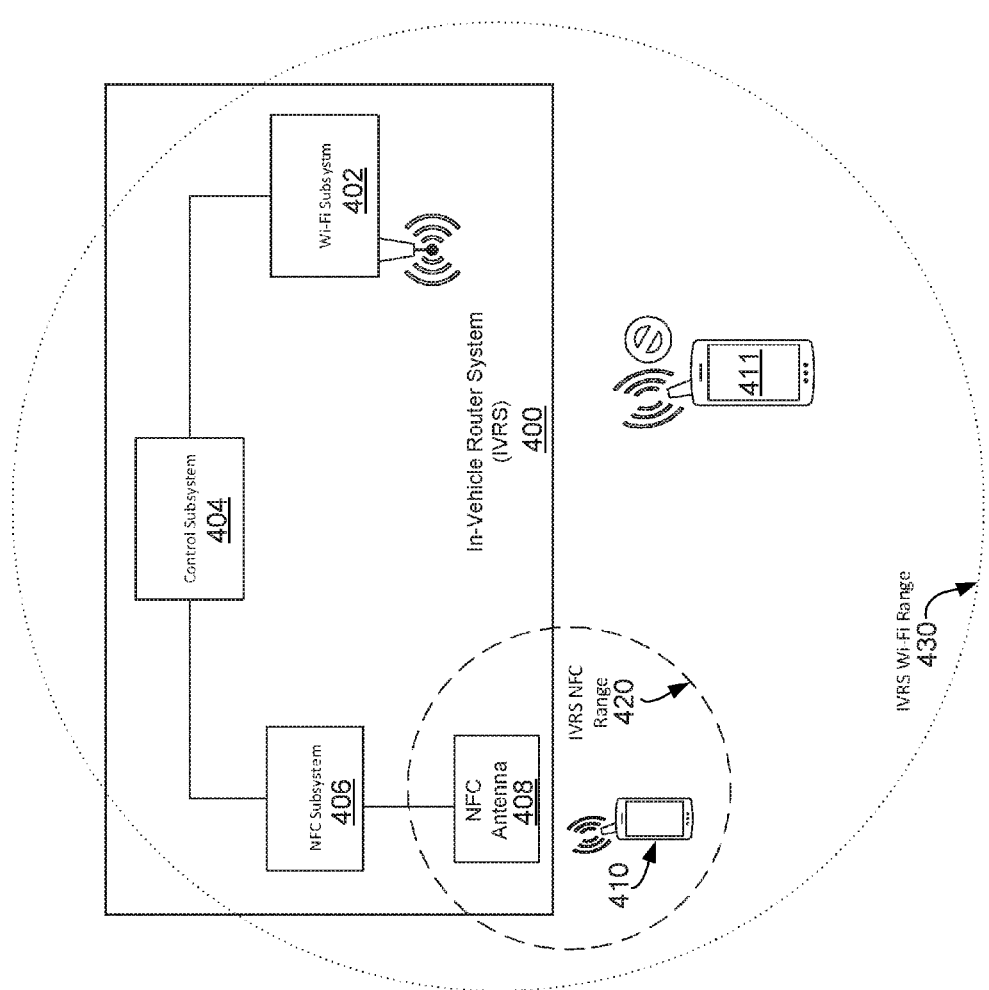
FIG. 4 shows an environment in which the router system can manage access to the Wi-Fi network.

FIG. 4 shows an environment in which the router system can manage access to a wireless network. The IVRS can grant wireless network access to a portable device that has established an NFC session while requesting Wi-Fi network access.

Access to a Wi-Fi network can be controlled by keeping the shared network access key secret. Because of the wireless nature, any portable device that obtains the shared key of a Wi-Fi network can be able to connect to that Wi-Fi network. Once a portable device has the shared key, it is relatively easy to pass the shared key information to other portable devices without the IVRS administrator's approval.

The Wi-Fi network communication range is far greater than the size of the vehicle. Therefore it can be possible for rogue portable devices outside of the vehicle to connect to the vehicle's Wi-Fi network and compromise in-vehicle network safety. The two-stage authentication method and system described herein provides at least two advantages: (1) restricting access to portable devices and (2) ensuring portable devices connect to the correct network.

Two-stage authentication can be used to restrict access to portable devices that are physically inside the vehicle at the time of granting Wi-Fi network access. Portable devices that are outside the range of NFC device are not permitted to establish a Wi-Fi network connection. The NFC device can be located within a vehicle and have a communication range of several centimeters (e.g., ranging from approximately four cm to approximately 15 cm). Due to a limited communication range of the NFC device, a portable device outside of a vehicle may not be able to communicate with the NFC device, and thus, may not be permitted to connect to the wireless network.

IVRS 400 can include a wireless subsystem 402 (e.g., a Wi-Fi subsystem), control subsystem 404, NFC subsystem 406, and NFC antenna 408. NFC antenna 408 may have a communication range 420. The wireless subsystem 402 has a communication range 430. The communication range 430 of the Wireless subsystem 402 can be larger than the communication range 420 of the NFC antenna 408. For example, the communication range 430 of the wireless subsystem 402 installed in a vehicle can extend beyond the limits of the vehicle, and the communication range 420 of the NFC antenna 408 can be limited to within the vehicle. The IVRS can grant wireless network access to portable device 410 since it is within the communication range of both the NFC antenna 408 and the wireless subsystem 402. The IVRS may not grant wireless network access to portable device 411 since it is not within communication range of the NFC antenna 408.

Figure 5:
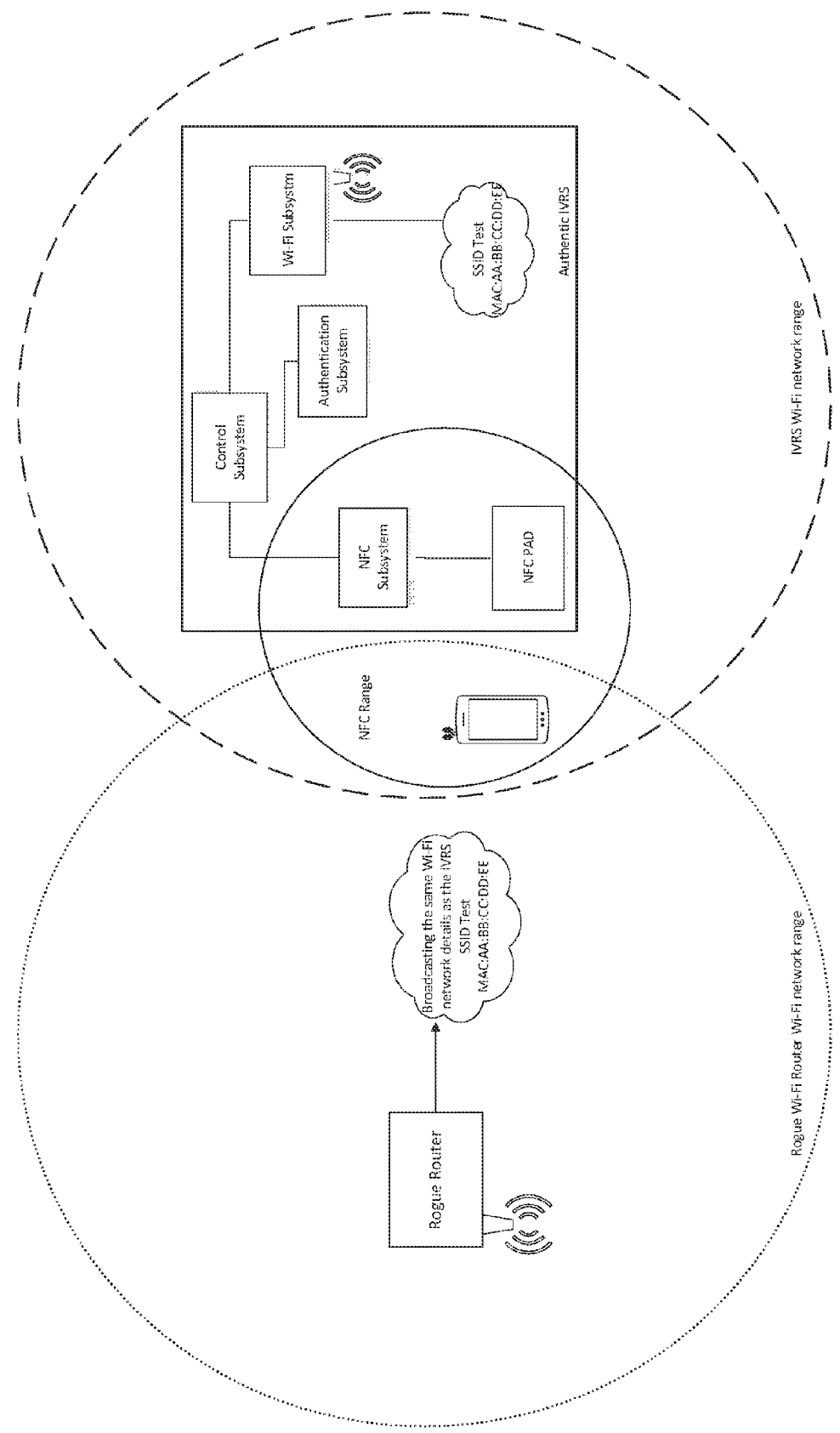
FIG. 5 shows the router system enabling a portable device to distinguish between a rogue router and the router system.

FIG. 5 shows the router system enabling a portable device to distinguish between a rogue router and the authentic router system (e.g., an in-vehicle router system). The two stage authentication process can enable a portable device to distinguish between rogue wireless networks and an authentic wireless network (e.g., a particular in-vehicle router system) by validating the wireless network connection with the IVRS.

Two-stage authentication can enable portable devices to ensure that they connect to the correct IVRS wireless network, thus protecting the portable devices from rogue wireless networks. For example, the second stage can be used for a portable device to confirm that a wireless network connection is provided by the IVRS and not a rogue network. A rogue network is a network having similar credentials as the IVRS and thus appearing to the portable device as being provided by the IVRS.

A portable device located within a vehicle transmits a first token to a wireless access point (AP) associated with the IVRS of the vehicle, via a first local wireless link, to prompt the wireless access point to reply with a second token. The first wireless link (e.g., a link implemented by an NFC subsystem) of the IVRS can receive a token from the portable device. The first wireless link implements a first protocol stack (e.g., an NFC compliant protocol stack). In response to receiving the first token, a second wireless link of the IVRS transmits a second token corresponding to the first token to the portable device. The portable device receives the second token via a second local wireless link (e.g., a link implemented by a Wi-Fi subsystem) between the portable device and the IVRS, the second wireless link implementing a second protocol stack (e.g., a Wi-Fi compliant protocol stack) different from the first protocol stack. The portable device determines whether the second token matches the first token. If the second token is determined to match the first token, the portable device authenticates the wireless AP. If the second token is determined to differ from the first token or does not arrive within a predetermined time limit, the portable device may abort the session with the IVRS.

Figure 6:
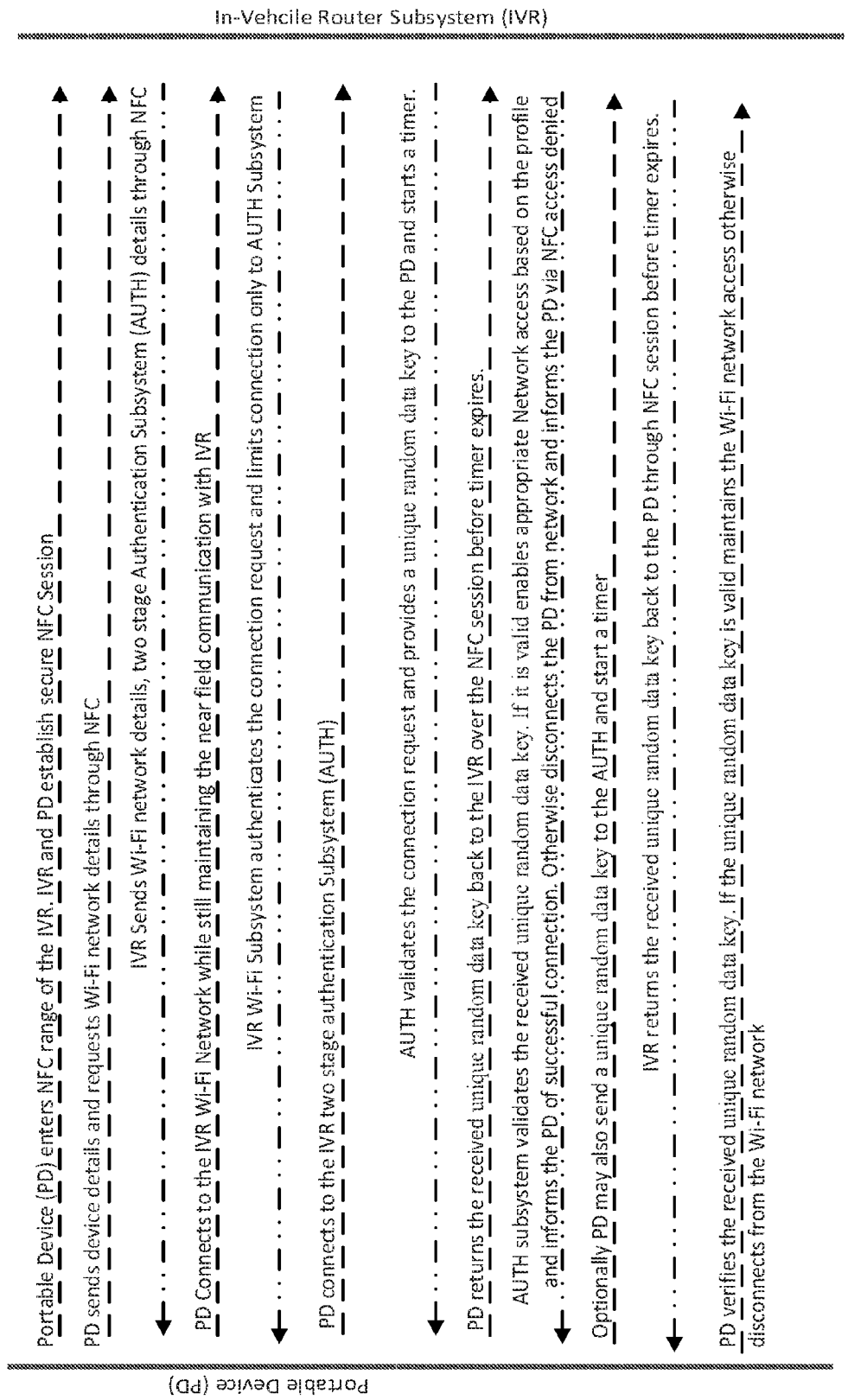
FIG. 6 is a diagram showing typical steps involved in a two-stage authentication process.

FIG. 6 is a diagram describing steps involved in a two-stage authentication process. The Authentication subsystem is responsible for validating the identity of the portable device that is requesting access to Wi-Fi network over an NFC session. The IVRS provides the Wi-Fi network details and authentication subsystem connection details to the portable device that requests Wi-Fi access through an NFC session. While maintaining the NFC session with the IVRS, the portable device will attempt to connect to the Wi-Fi network. The IVRS will authenticate the portable device and initially limit network access to the Authentication subsystem. Once the Wi-Fi connection is established, the portable device will proceed to connect to the Authentication subsystem. Once the connection is verified, the IVRS Authentication subsystem will issue a challenge response. A token (e.g., a unique random data key) will be provided to the portable device through one network connection session (Wi-Fi or NFC) and the portable device will communicate the received token back to the IVRS over the other network connection session. The IVRS authentication subsystem will verify that the token received from the portable device matches the token transmitted to the portable device. Once it is verified, the IVRS will enable appropriate network access privilege to the portable device. The unique random data key can be a long sequence of ASCII characters or any binary data, including audio and images.

The portable device in turn will send a random token to the IVRS Authentication subsystem over one network connection session (Wi-Fi or NFC). The IVRS will then return the received token back to the portable device through another network connection session already in place. The portable device will attempt to validate the received token. If the received token is valid, then the portable device knows that it is connected to the correct IVRS.

Figure 7:
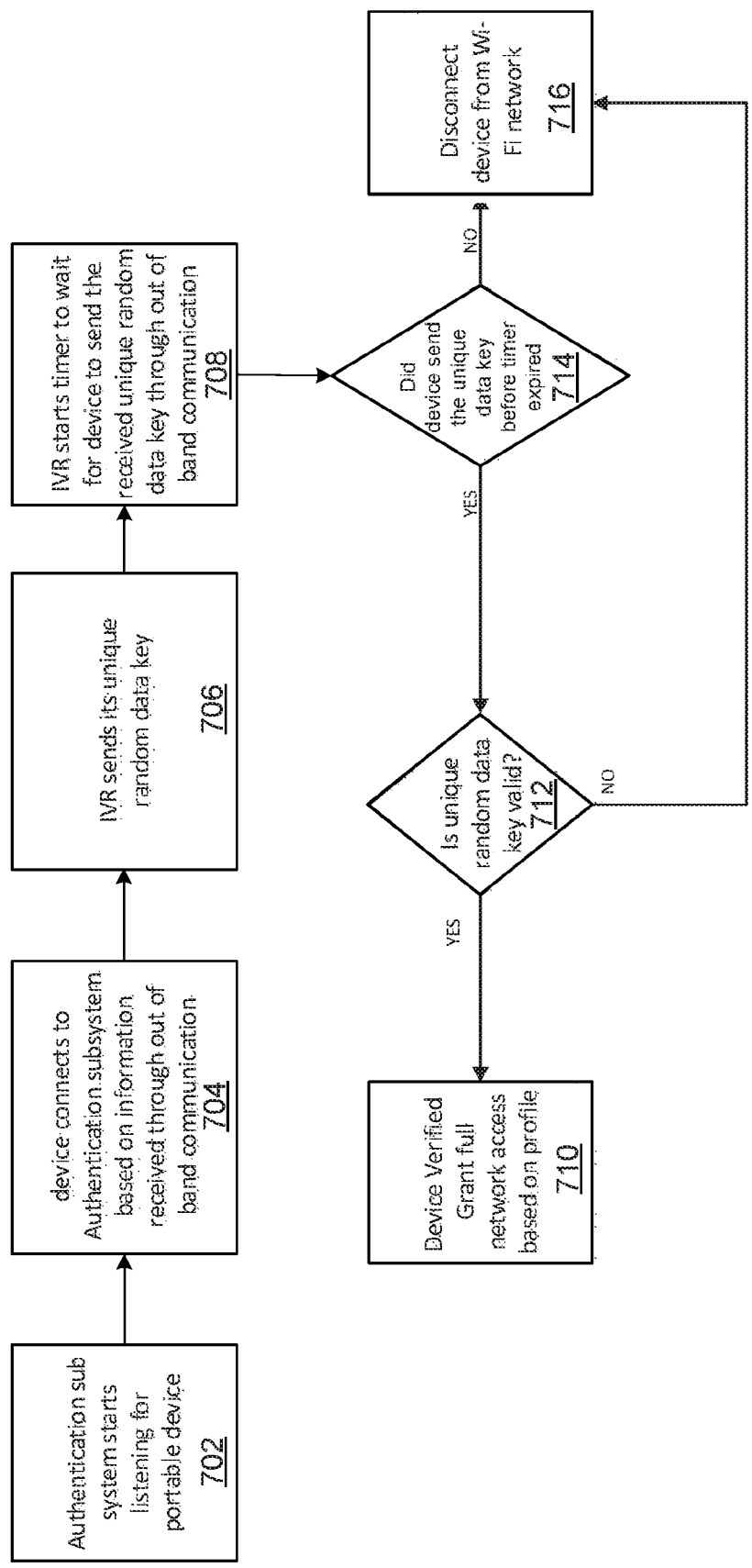
FIG. 7 is a flow diagram of a two-stage authentication process for verifying devices connecting to a network.

FIG. 7 is a flow diagram of an authentication process for verifying devices connecting to a network.

The IVRS can start listening for a message from a portable device (702). The IVRS establishes communication with a portable device where the communication is limited to a secure subsystem (e.g., the authentication subsystem) (step 704). The IVRS transmits (e.g., via a router) a token (e.g., a random data key) to the portable device (step 706). The IVRS can start a time to limit acceptance of the token back from the portable device within a certain time frame (step 708). The portable device receives the token and transmits the token back to the IVRS (e.g., via an NFC device). The IVRS receives the token from the portable device.

The IVRS determines whether the token is received before expiration of a threshold time period (decision 714). The threshold time period can be, for example, selected by an administrator of the IVRS or set to an expected response time. If the token is not received before expiration of the time frame, the IVRS can terminate communication (e.g., disconnect Wi-Fi) with the portable device (step 716). If the token is received before expiration of the time frame, the IVRS determines whether the transmitted token matches the received token (decision 712). If the transmitted token does not match the received token, the IVRS denies network access privilege to the portable device (e.g., disconnect Wi-Fi) (step 716). If the transmitted token matches the received token, the IVRS obtains authorization to enable network access privilege to the portable device (step 710). For example, the IVRS can identify the portable device among a plurality of authorized portable devices and grant full network access. In another example, the IVRS may not recognize the portable device (or a profile associated with the portable device) and request authorization from an administrator of the IVRS. Obtaining authorization from a device associated with an administrator of the IVRS is discussed below with reference to FIG. 9.

Figure 8:
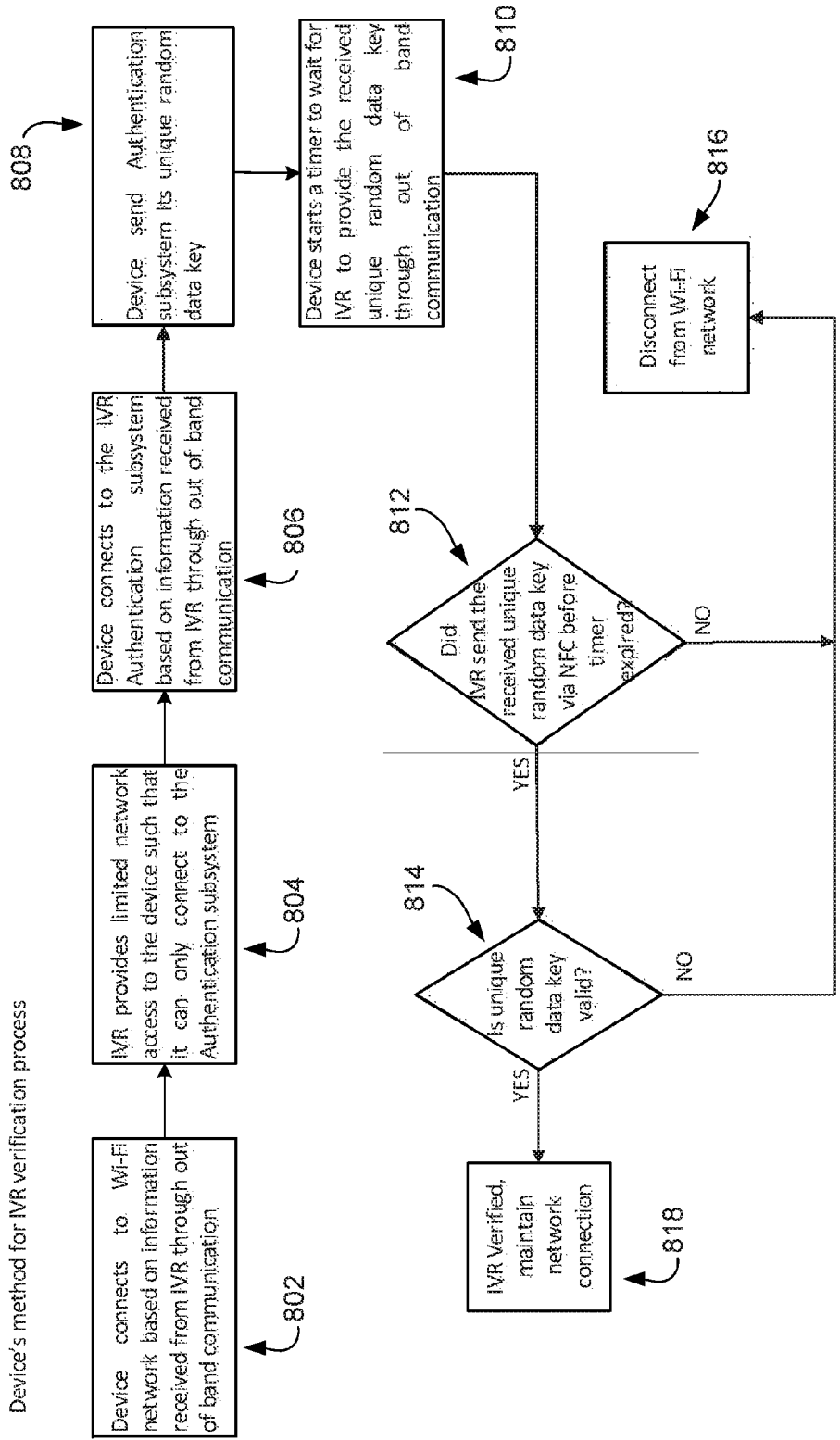
FIG. 8 is a flow diagram of a process for distinguishing between a rogue router and the router system.

FIG. 8 is a flow diagram of a process for distinguishing between a rogue router and the router system. The process may be used by a portable device to verify the IVRS and distinguish it from a rogue system.

A portable device can connect to a wireless network (e.g., a Wi-Fi network) based on information received from an out of band communication channel (e.g., NFC) (step 802). The IVRS provides limited network access to the portable device (e.g., limited to the authentication subsystem) (step 804). The portable device connects to a limited subsystem (e.g., the authentication subsystem) based on information received from the out of band communication (step 806). The portable device sends a token to the IVRS (e.g., to the authentication subsystem) (step 808). The portable device starts a timer at approximately the moment the portable device sends the token (step 810). The portable device may receive a token back from the IVRS over an out of band communication channel (e.g., NFC) and/or the time period may expire without receiving the token. The portable device determines whether the token (e.g., a unique random key) was received within a time period (e.g., a time period configured by a user) (step 812). If the token is not received within the time period, the portable device disconnects from the wireless network (step 816). If the token is received within the time period, the portable device determines whether the received token matches the sent token (step 814). If the tokens match, the portable device maintains the wireless connection with the IVRS (step 818).

By verifying that the tokens match, the probability that the portable device is connected to the IVRS and not a rogue network is greatly increased, thus increasing security for the portable device. If the tokens do not match or a response is not promptly received, the wireless network to which the portable device is connected may not be the IVRS. By enabling a communication exchange of a randomized token via an out of band device providing service locally within a vehicle, the method above can ensure with near certainty that the portable device is connected to the IVRS and not a rogue network.

Figure 9:
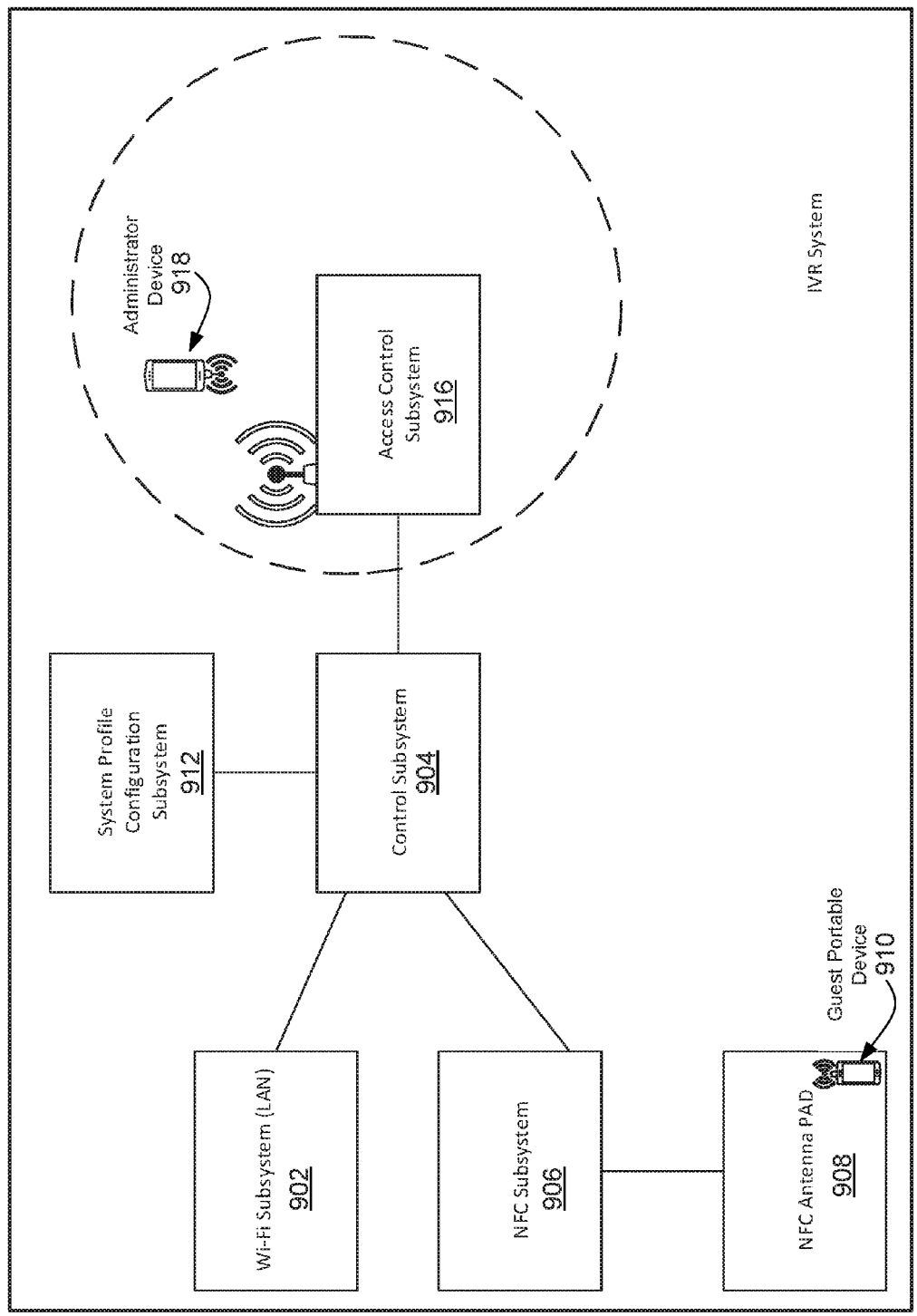
FIG. 9 is a block diagram illustrating managing access to the router system by a device associated with an administrator.

FIG. 9 is a block diagram illustrating managing access to the IVRS. In an embodiment, an administer device 918 can authorize or deny network access for a guest device 910.

The IVRS can include an NFC subsystem 906 connected to guest device 910 via an NFC antenna pad 908. Control subsystem 904 manages the NFC subsystem 906 as well as various other subsystems, including, for example, wireless local area network (WLAN) subsystem 902, system profile configuration subsystem 912, and access control subsystem 916. The WLAN subsystem 902 can support any local area network known in the art, such as, for example, a Wi-Fi network. The system profile configuration subsystem 912 can store and update Access Control List (ACL) and a Blocked Access Control List (BACL) including authorized and unauthorized profiles, respectively. A profile can include information associated with a device, such as, for example, a telephone number, MAC address, device model information, international mobile station equipment identity (IMEI), etc. The access control subsystem 916 can facilitate communication with one or more administrator devices 918.

Any device, other than administrator devices 918, can be considered a guest device 910. A guest device 910 that is allowed to connect to the in-vehicle wireless network can be required to have a valid network access profile or receive authorization from the administrator device 918. If the guest device 910 receives authorization from the administrator device 918, a network access profile can be generated for the device. The network access profile defines access privilege for the network and the services available on that network. If the guest device 910 has a valid network access profile, the IVRS may not request authorization from the administrator device 918 to connect the device to the in-vehicle wireless network. The IVRS can have multiple networks and services that the guest device 910 can utilize. The administrator (e.g., operator of the administrator device 910) can locally and remotely manage devices requesting to connect to in-vehicle wireless networks and services.

The access control subsystem 916 includes both software and hardware. It is responsible for controlling access to the IVRS network and services. It is also responsible for contacting the IVR administrator to request network access on behalf of the guest device 910. The access control subsystem 916 can include one or more wired or wireless communication devices, such as, for example, a bus connector, wireless router, wireless mobile telecommunications device (e.g., Long Term Evolution, 4G, etc.), or any combination of communications devices. The access control subsystem 916 can connect with the administrator device 918 directly or indirectly (e.g., through an intermediary network).

When a portable device requests a connection with the IVRS network, a network access application running on the portable device will submit the request to the IVRS through Near Field Communication (e.g., as described with reference to FIGS. 1A-1B). The request message contains information pertaining to the owner of the portable device and the device itself. The device owner information can include, but is not limited to name and e-mail address, and device information can include, but is not limited to, the MAC address, device model information, international mobile station equipment identity (IMEI), and mobile number. The access control subsystem 916 checks if the portable device already has a network access profile in an Access Control List (ACL) that the IVRS maintains. If a network access profile already exists, then the Access Control subsystem will work with other subsystems of the IVRS to allow appropriate access to the portable device. If the device is contained in the Blocked Access Control List (BACL), then IVRS informs the portable device through the already established near field communication session, that the device is in the blocked device list.

If the access control subsystem 916 does not find a network access profile for the device in both the ACL and BACL, it contacts the administrator using the administrator communication profile details stored within configuration management subsystem. The administrator communication profile contains a prioritized list of contact methods such as SMS, email, or an alert on a mobile application. The IVRS will try to contact the administrator to request authorization to create a network access profile for the new portable device. The request to the administrator contains information identifying the owner and the portable device. The IVRS updates the guest device 910 on the progress in reaching the administrator for network access requested through the current Near Field Communication session. If the administrator grants access to the in-vehicle networks and services, the guest device 910 will be added to the ACL and the IVRS will provide the guest device 910 with the access information through the Near Field Communication session. If the administrator rejects the access request, the guest device 910 will be added to the BACL and the IVRS will inform the guest device 910 its request for access has been rejected and any further attempts to access the network will be blocked. If the IVRS's effort to contact an administrator times out, then the guest device 910 will be denied access to the network and the guest device 910 will be informed of the outcome via the current Near Field Communication session. Such a system will allow an administrator (e.g., a vehicle owner) to manage access to the vehicle's wireless networks even when he/she is not in the vehicle.

Figure 10A:
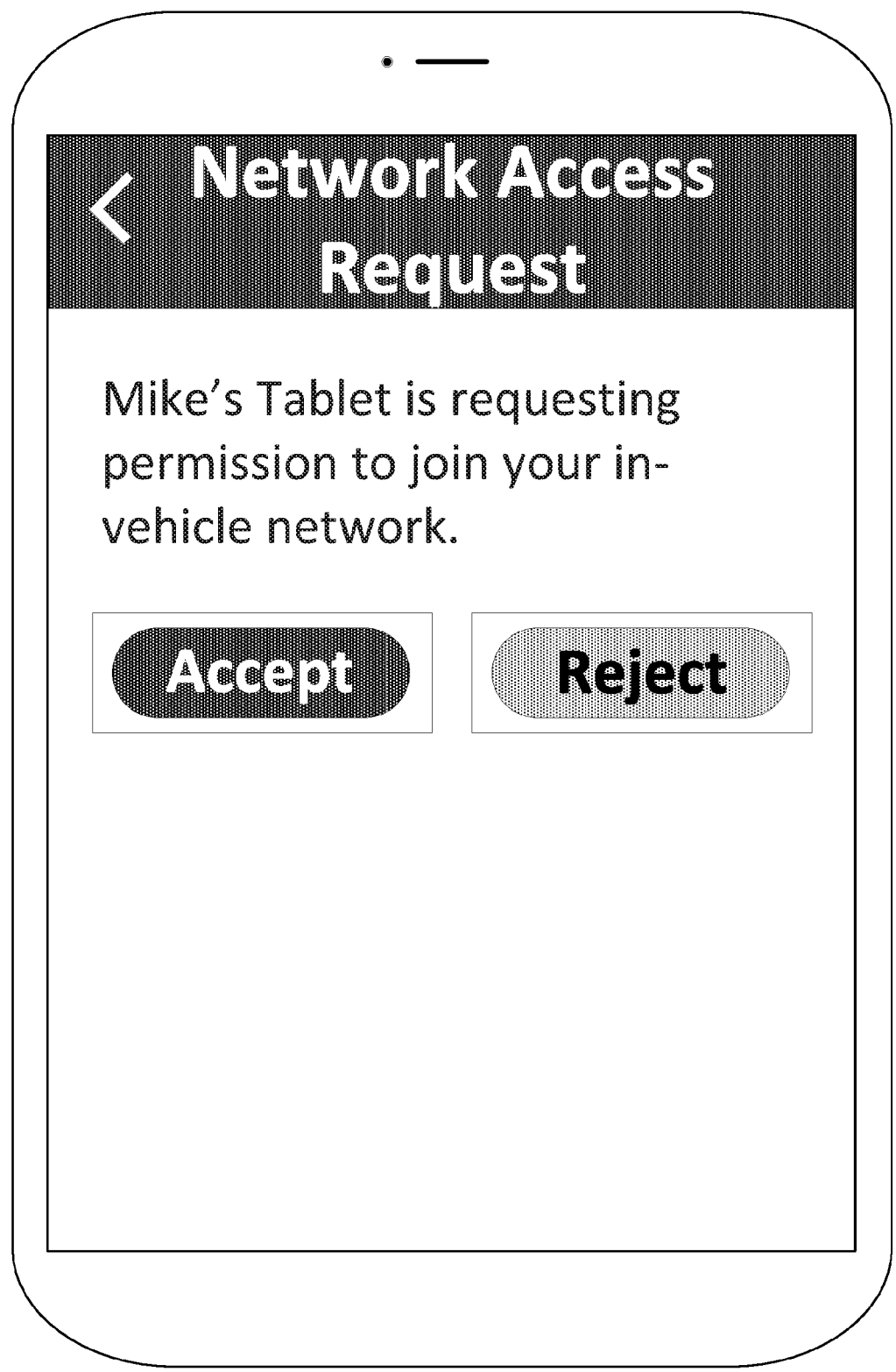
FIG. 10A is an illustration of a mobile application managed by an administrator of the in-vehicle router system.
Figure 10B:
FIG. 10B is an illustration of a mobile application managed by an administrator of the in-vehicle router system.

FIGS. 10A-10B are illustrations of a mobile application managed by an administrator of the in-vehicle router system. Although FIGS. 10A-10B illustrate a mobile device, an administrator device (e.g., administrator device 918) can be any device known in the art capable of receiving and transmitting messages, such as, for example, a desktop computer, laptop computer, server, pager, wearable device (e.g., smart watch), etc.

The mobile application can be executed by a processor of an administrator device and provide an output perceivable to an administrator. For example, the mobile application can display text indicating information about a guest device attempting to gain access to the IVRS (e.g., device name, phone number, user name associated with the guest device, etc.). The mobile application can include one or more buttons that can be activated, for example, via a touchscreen display. For example, the mobile application can provide an "Accept" button and/or a "Reject" button so a user (e.g., the administrator) of the administrator device can authorize (e.g., by selecting "Accept") or deny (e.g., by selecting "Reject") access of a guest device via the touchscreen display.

The mobile application can provide a list of devices authorized (e.g., added to the ACL) and/or blocked (e.g., added to the BACL) from connecting to the in-vehicle wireless network provided by the IVRS. For example, as shown in FIG. 10B, "Jane's Phone" and "John's Phone" can be authorized to connect to the in-vehicle wireless network, while "Mike's Tablet" can be blocked from connecting to the in-vehicle wireless network. The mobile application can provide virtual buttons configured to move a device from the ACL to the BACL and vice-versa by triggering the virtual button on the touchscreen display. For example, the administrator device can receive an input associated with the virtual button displayed adjacent to "Jane's Phone" to cause the profile associated with "Jane's Phone" to move from the ACL to the BACL. The mobile application also verifies that the application user is a network administrator.

Figure 11A:
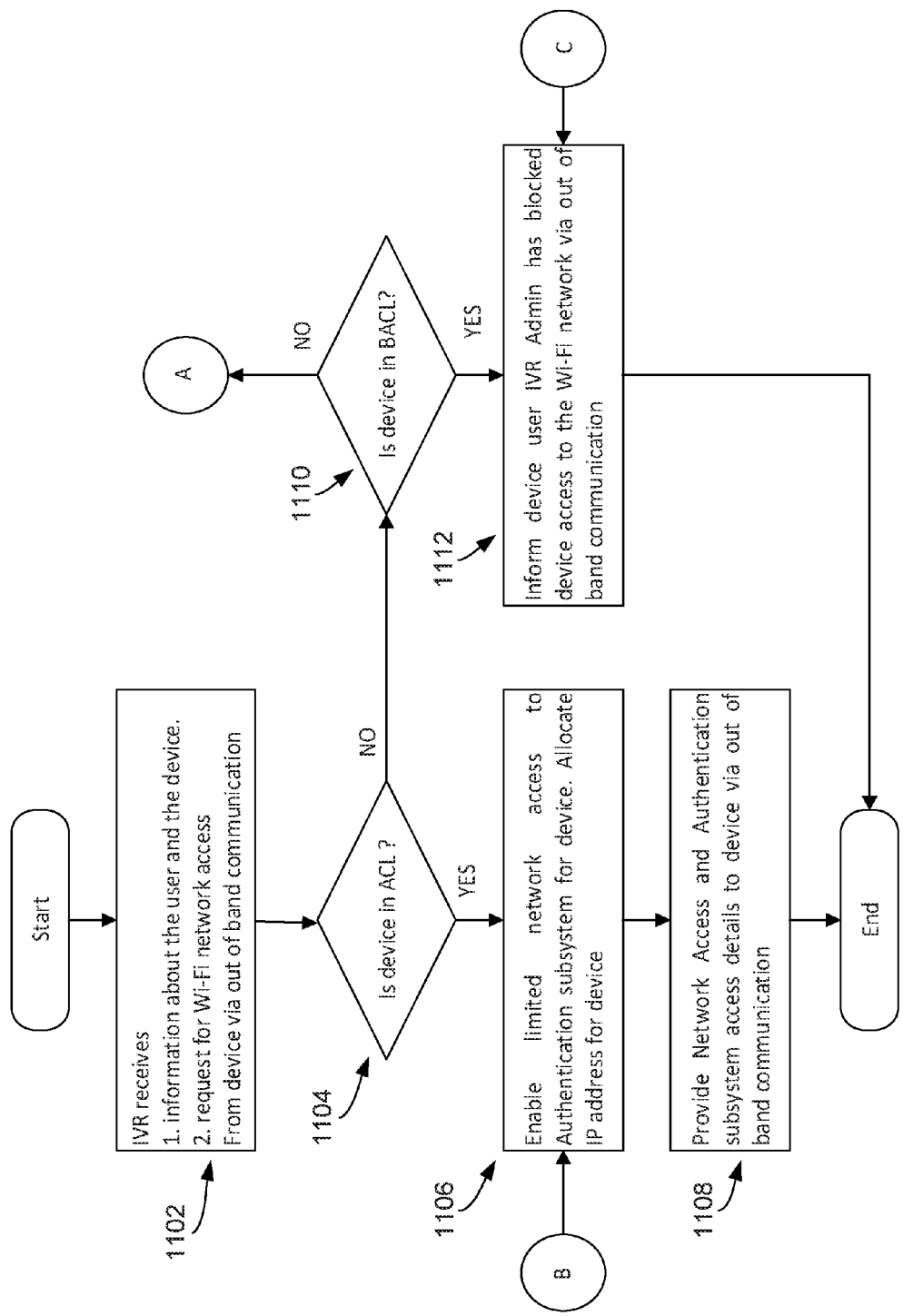
FIG. 11A is a flow diagram of a process for managing network access for portable devices.
Figure 11B:
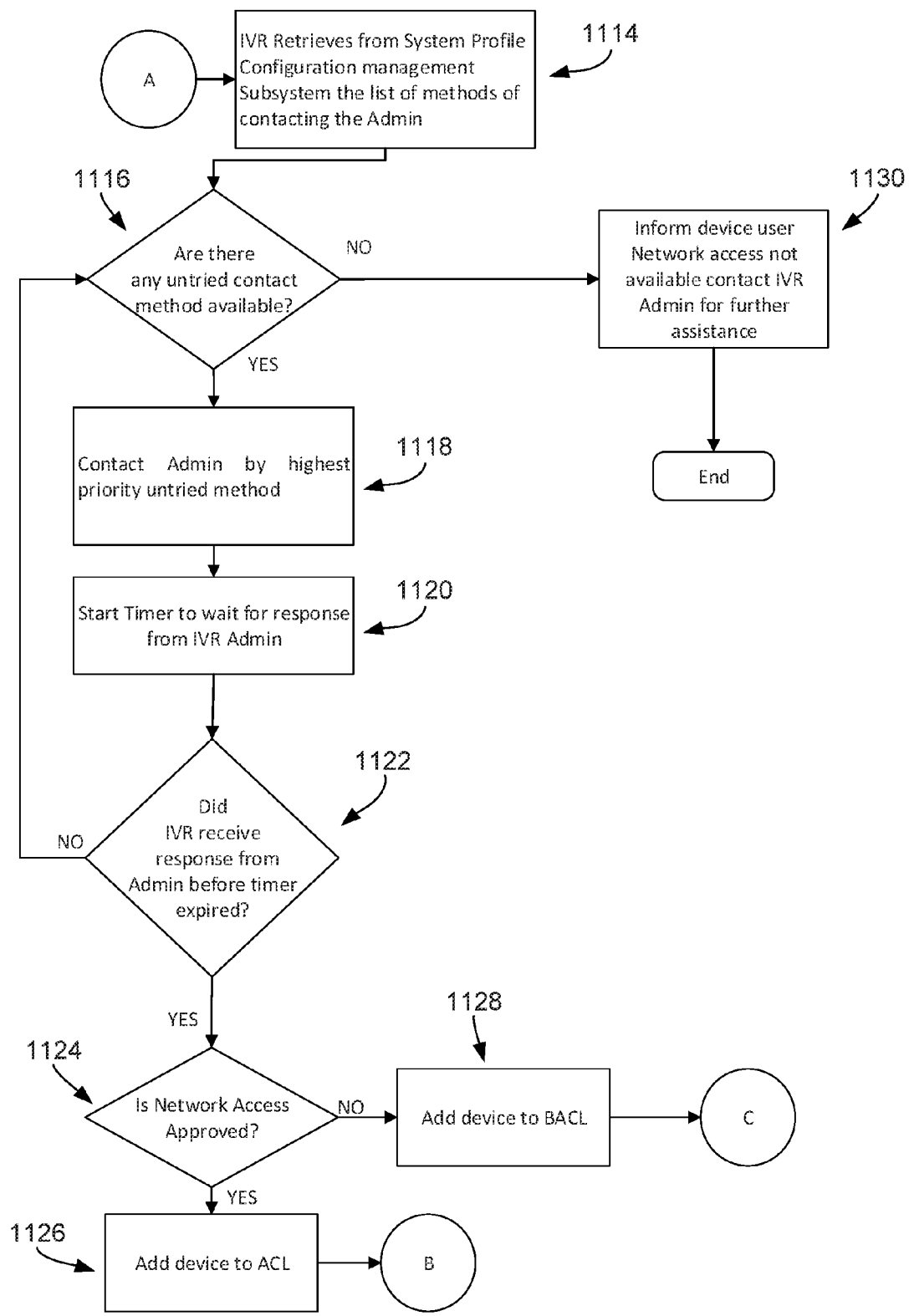
FIG. 11B is a flow diagram of a process for managing network access for portable devices.

FIGS. 11A-11B are flow diagrams of a process for managing network access for portable devices included in an allowed or blocked list (e.g., ACL or BACL) and devices not included in an allowed or blocked list (e.g., new devices).

In step 1102, the IVRS receives information about a user and/or the portable device and receives a request for wireless network access via out of band communication (e.g., NFC). The IVRS determines whether the device is on the access control list (ACL) (decision 1104). If the portable device is on the ACL, the IVRS enables limited network access to a secure subsystem (e.g., the authentication subsystem) (step 1106). In step 1108, the IVRS provides network access and authentication subsystem access details to the device via an out of band communication (e.g., NFC). The device can use the network access details to access an in-band network (e.g., WLAN).

If the portable device is not on the ACL, the IVRS determines whether the device is on the blocked access control list (BACL) (decision 1110). If the portable device is blocked, a message is transmitted via an out of band communication (e.g., NFC) to the portable device indicating that the portable device does not have access to the in-band network (e.g., WLAN) (step 1112).

If the portable device is not on the BACL, the IVRS retrieves a list of methods for contacting the administrator device from the system profile configuration subsystem (step 1114). The IVRS determines whether there are untried methods for contacting an administrator device (decision 1116). If there are no untried methods, the IVRS informs the portable device that network access is not available and may suggest contacting an IVRS administrator (step 1130).

If an untried method exists, the IVRS attempts to contact an administrator device using a highest priority untried method (step 1118). In step 1120, the IVRS may start a timer to set a time period for response from the administrator device. The IVRS may determine whether a response was received before expiration of the time period (step 1122). If the IVRS did not receive a response before expiration of the time period, decision 1116 may be repeated.

If the IVRS receives a response from an administrator device, the IVRS determines whether network access for the portable device is authorized (decision 1124). If network access is authorized, the portable device is added to the ACL (step 1126) and step 1106 can be performed. If network access is not authorized, the portable device is added to the BACL (step 1128) and step 1112 can be performed.

Figure 12:
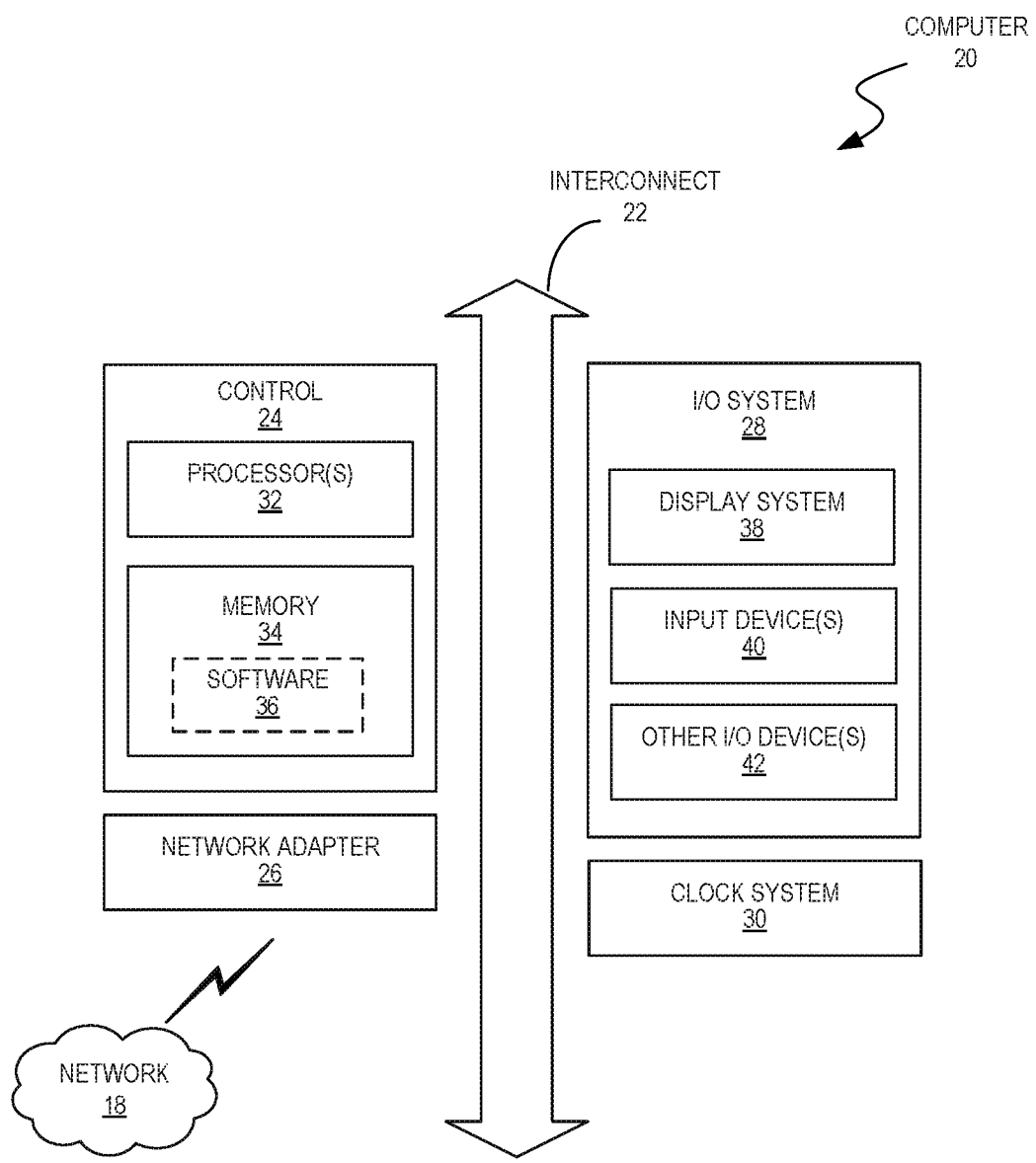
FIG. 12 is a block diagram of a computer system as may be used to implement features of some embodiments of the disclosed technology.

FIG. 12 is a block diagram of a computer system as can be used to implement features of some embodiments of the disclosed technology. The computing system 20 can be used to implement any of the entities, components or services depicted in the examples of FIGS. 1A-11B (and any other components described in this specification). The computing system 20 can include one or more central processing units ("processors") 32, memory 34, input/output devices 38, 40, and 42 (e.g., keyboard and pointing devices, display devices), and network adapters 26 (e.g., network interfaces) that are connected to an interconnect 22. The interconnect 22 is illustrated as an abstraction that represents any one or more separate physical buses, point to point connections, or both connected by appropriate bridges, adapters, or controllers. The interconnect 22, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 34 is a non-transitory computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection.

The instructions stored in memory 34 can be implemented as software 36 and/or firmware to program the processor(s)

32 to carry out actions described above. In some embodiments, such software 36 or firmware can be initially provided to the computing system 20 by downloading it from a remote system through the computing system 20 (e.g., via network adapter 26).

What is claimed is:

1. A method comprising:
   establishing communication with an in-vehicle router system (IVRS) by a portable device, the portable device communicating with the IVRS via a first communication link and a second communication link, wherein the established communication is maintained to facilitate:
   transmitting, by a portable device located within a vehicle, a first token to a wireless access point (AP) associated with the IVRS, via a first communication link, to prompt the wireless AP to reply with a second token, the first communication link implementing a first protocol stack; and
   receiving, by the portable device, the second token via the second communication link between the portable device and the IVRS, the second communication link implementing a second protocol stack different from the first protocol stack;
   determining, by the portable device, whether the second token matches the first token; and
   authenticating the wireless AP, by the portable device, only when the second token has been determined to match the first token.

2. The method of claim 1, wherein the portable device establishes communication with the IVRS by the following steps:
   transmitting, by the portable device via the second communication link, a request for network access credentials and a first set of identification information;
   receiving, by the portable device via the second communication link, a set of network access credentials for connecting to the first communication link; and
   transmitting, by the portable device via the first communication link, a connection request using the set of network access credentials, wherein the IVRS is configured to authenticate the portable device by verifying the network access credentials.

3. The method of claim 1, wherein the first token is communicated from the portable device to the wireless AP via either of a wireless local area network (WLAN) link or a near field communication (NFC) link.

4. The method of claim 3, wherein the second token is communicated over a communication link other than a communication link in which the first token is communicated.

5. The method of claim 1, wherein the second communication link has a communication range limited to within the vehicle.

6. The method of claim 1, wherein the second communication link is either of a near field communication (NFC) link or a universal serial bus (USB) link.

7. The method of claim 1, further comprising:
   terminating communication in response to determining that communication is with a rogue wireless system.

8. The method of claim 1, wherein the first token is produced using a random or pseudo-random value generator.

9. The method of claim 1, wherein the first token and the second token include binary patterns.

10. A method comprising:
    establishing communication with a portable device by an in-vehicle router system (IVRS), the IVRS communicating with the portable device over a wireless local access network (WLAN) and a short range communication link, wherein communication by the portable device with the IVRS is limited to communication with an authentication subsystem of the IVRS, wherein the established communication is maintained to facilitate:
    transmitting, via the WLAN, a first token to the portable device; and
    receiving, via the short range communication link, a second token from the portable device;
    determining whether the first token matches the second token; and
    determining network access privilege of the portable device only when the first token has been determined to match the second token.

11. The method of claim 10, wherein the WLAN and the short range communication link remain established at least until network access privilege is granted to the portable device.

12. The method of claim 10, wherein establishing communication with the portable device comprises:
    receiving from the portable device, via the short range communication link, identification information and a request for network access credentials;
    transmitting to the portable device, via the short range communication link, network access credentials for connecting the portable device to the wireless AP;
    receiving from the portable device, via the WLAN, a connection request using the network access credentials;
    authenticating the portable device, by the IVRS, by verifying the network access credentials; and
    in response to authenticating the portable device, enabling limited communication by the portable device to the authentication subsystem.

13. The method of claim 10, further comprising:
    receiving, via the short range communication link, a third token from the portable device; and
    in response to receiving the third token, transmitting to the portable device, via the WLAN, a fourth token corresponding to the third token, the portable device being configured to verify that the third token matches the fourth token,
    wherein the short range communication link and the WLAN remain active until verification by the portable device is complete.

14. The method of claim 10, further comprising:
    receiving, via the WLAN, a third token from the portable device; and
    in response to receiving the third token, transmitting to the portable device, via the short range communication link, a fourth token corresponding to the third token, the portable device being configured to verify that the third token matches the fourth token,
    wherein the WLAN and the short range communication link remain active until verification by the portable device is complete.

15. The method of claim 10, further comprising:
    determining that the portable device does not have network access privilege if an elapsed time between transmitting the first token to the portable device and receiving the second token from the portable device is greater than a threshold time period.

16. The method of claim 10, wherein the first token is produced using a random or pseudo-random value generator.

17. The method of claim 10, further comprising:
generating another token in response to at least one of a startup of a vehicle, expiration of a time period, request from an administrator, or a portable device establishing communication with the authentication subsystem of the IVRS.

18. The method of claim 10, wherein another token is generated using a random or pseudo-random value generator.

19. The method of claim 10, wherein the first token and the second token include binary patterns.

20. The method of claim 10, wherein obtaining authorization to enable network access privilege to the portable device comprises at least one of:
receiving authorization for the portable device from an administrator of the IVRS; or
identifying the portable device among one or more authorized devices previously authorized by an administrator of the IVRS.

21. The method of claim 10, wherein a communication range of the short range communication link is limited to within a vehicle.

22. A method comprising:
establishing, by a portable device within a vehicle, communication with a wireless access point (AP) associated with an in-vehicle router system (IVRS) of a vehicle, the portable device communicating with the IVRS over a wireless local access network (WLAN) and a short range communication link, the communication by the portable device with the IVRS being limited to communication with an authentication subsystem of the IVRS, wherein the established communication is maintained to facilitate:
receiving, by the portable device via the WLAN, a first token, the first token having randomly generated data produced by the IVRS in response to the WLAN connection by the portable device; and
transmitting, by the portable device via the short range communication link, the first token to the IVRS to prompt the IVRS to grant network access privilege to the portable device;
transmitting, by the portable device, a second token via the short range communication link to the IVRS; and
receiving, by the portable device, a third token via the WLAN from the IVRS;
determining, by the portable device, whether the second token matches the third token; and
authenticating the wireless AP, by the portable device, only when the second token has been determined to match the third token.

23. The method of claim 22, wherein the WLAN and the short range communication link remain established at least until authenticating the wireless AP is performed by the portable device.

24. The method of claim 22, wherein establishing communication with the IVRS comprises:
transmitting, by the portable device via the short range communication link, a request for network access credentials and a first set of identification information;
receiving, by the portable device via the short range communication link, information for connecting to the WLAN; and
transmitting, by the portable device via the WLAN, a connection request using the network access credentials, wherein the IVRS is configured to authenticate the portable device by verifying the network access credentials and establish communication with the authentication subsystem.

25. The method of claim 22, wherein the second token is not determined to match the third token if a time period expires before receiving the third token.

26. The method of claim 22, further comprising:
receiving network access credentials from the IVRS, wherein the network access credentials enable the portable device to access a network via the IVRS.

27. An in-vehicle router system comprising:
a wireless access point (AP) configured to communicate with a portable device over a wireless local access network (WLAN);
one or more near field communication (NFC) or wired communication devices configured to communicate with the portable device over a short range communication link; and
at least one processor configured to:
establish communication with the portable device via the wireless AP and the short range communication link, wherein communication with the in-vehicle router system is limited to an authentication subsystem of the in-vehicle router system, wherein the established communication is maintained to facilitate:
transmit by the wireless AP, via the WLAN, a first token to the portable device, wherein the first token is produced by a random or pseudo-random generator; and
receive, via the short range communication link, a second token from the portable device;
determine whether the first token matches the second token; and
determine network access privilege of the portable device only when the first token has been determined to match the second token.

28. The in-vehicle router system of claim 27, wherein the at least one processor is configured to establish communication with the portable device by performing the following:
receive, via the short range communication link, a request for network access credentials and a first set of identification information from the portable device;
transmit, via the short range communication link, information for connecting the wireless AP to the portable device;
receive, via the wireless AP, a connection request using the network access credentials from the portable device; and
authenticate the portable device by verifying the network access credentials, and in response to authenticating the portable device, enable limited communication to the secure subsystem.

29. The in-vehicle router system of claim 27, wherein the at least one processor is further configured to:
receive, via the short range communication link, a third token from the portable device; and
in response to receiving the third token, transmit, via the WLAN, a fourth token corresponding to the third token to the portable device, wherein the portable device is configured to verify that the third token matches the fourth token.

30. The in-vehicle router system of claim 27, wherein the portable device is determined not to have network access privilege if a time elapse between transmitting the first token and receiving the second token is greater than a threshold time period.

31. The in-vehicle router system of claim 27, wherein the at least one processor is further configured to:
in response to determining the first token does not match the second token, transmit, via the short range communication link, a message to the portable device indicating that network access is denied.

32. The in-vehicle router system of claim 27, wherein the at least one processor is further configured to perform at least one of:
receive authorization for the portable device from an administrator of the IVRS; or
identify the portable device among one or more authorized devices previously authorized by an administrator of the IVRS.

33. The in-vehicle router system of claim 27, wherein the at least one processor is further configured to contact an administrator device to determine network access privilege of the portable device by at least one contact method of a hierarchical list of contact methods.

34. The in-vehicle router system of claim 33, wherein contact methods of the hierarchical list of contact methods include any of a text message, electronic mail, application notification, or automated voice message.

\* \* \* \* \*